FIG. 1

May 15, 1973  N. C. WYETH ET AL  3,733,309
BIAXIALLY ORIENTED POLY(ETHYLENE TEREPHTHALATE) BOTTLE
Filed Nov. 30, 1970  6 Sheets-Sheet 4

INVENTORS
NATHANIEL CONVERS WYETH
RONALD NEWMAN ROSEVEARE

BY Francis A. Paintin
ATTORNEY

INVENTORS
NATHANIEL CONVERS WYETH
RONALD NEWMAN ROSEVEARE

BY Francis A. Paintin

ATTORNEY

FIG. 11  FIG. 12  FIG. 13

United States Patent Office 3,733,309
Patented May 15, 1973

3,733,309
BIAXIALLY ORIENTED POLY(ETHYLENE
TEREPHTHALATE) BOTTLE
Nathaniel Convers Wyeth, Mendenhall, Pa., and Ronald
Newman Roseveare, Wilmington, Del., assignors to
E. I. du Pont de Nemours and Company, Wilmington,
Del.
Continuation-in-part of abandoned application Ser. No.
885,853, Dec. 17, 1969. This application Nov. 30, 1970,
Ser. No. 93,571
Int. Cl. B29c 5/06
U.S. Cl. 260—75 T                                    14 Claims

ABSTRACT OF THE DISCLOSURE

A hollow, biaxially oriented, thermoplastic article, particularly a bottle, prepared from polyethylene terephthlate wherein said article has an inherent viscosity of at least 0.55, a density of about 1.331 to 1.402 and a ratio of article weight in grams to volume in cubic centimeters of about 0.2 to 0.005:1. Such articles have excellent strength properties, are impact resistant, and are capable of holding liquids under pressures as high as about 100 p.s.i.g. at a temperature of about 50° C. without significant deformation making such articles useful in bottling liquids under pressure such as beer, carbonated beverages, or aerosols.

CROSS REFERENCE TO RELATED CASE

This application is a continuation-in-part of U.S. patent application Ser. No. 885,853, filed Dec. 17, 1969 and now abandoned.

BACKGROUND OF THE INVENTION

This invention relates to a hollow, biaxially oriented thermoplastic article, such as a bottle, particularly useful in bottling liquids under pressure, i.e. carbonated beverages or aerosols, etc., along with a method and apparatus for its production.

Thermoplastic bottles useful in bottling carbonated beverages wherein the bottle contains some autogenous pressure, and must have the properties necessary for such use. These properties include the necessary strength requirements to contain the beverage under pressures which can be as high as 100 p.s.i.g. without appreciable creep or serious deformation within the in-use temperature range of about 0 to 50° C. In addition, the bottle must have a low permeability rating, particularly with respect to carbon dioxide and oxygen. The continuous loss of carbon dioxide from a carbonated beverage, or the infusion of oxygen into a beverage such as beer, shortens the shelf life and alters the taste of the beverage.

Several methods are known for forming hollow thermoplastic articles. One method is blow molding. In conventional blow molding, a parison is first formed by extruding a heat-softened thermoplastic tube and pinching off the bottom or, alternatively, by injection molding of the blowable geometric form directly. Secondly, the parison or blowable form is then contained within a mold cavity having the volumetric configuration of the desired thermoplastic article and the parison is expanded by blowing it with compressed air within the confines of the mold cavity. The polymer is extruded and blown at elevated temperatures, namely above the orientation temperature range of the polymer. The article produced is not biaxially oriented. This process is economical but it is relatively slow and, more importantly, the hollow articles produced lack the necessary strength for use in bottling beverages under pressure.

Other prior art methods involve the use of solid plastic slugs which are extruded to form a hollow article. When a solid slug is extruded, the material that was originally situated at the slug axis of symmetry ultimately appears on the inner wall of the article being made and exhibits extreme roughness and other surface defects. The use of higher temperatures during the article formation tends to alleviate these adverse features but use of a high temperature is self-defeating, since possible strength gained from biaxial orientation of the plastic material during bottle formation is lost by heat relaxation.

These is a need, therefore, for an economical process with the necessary apparatus for producing a plastic bottle having characteristics which make it useful in bottling liquids under pressure such as carbonated beverages or aerosols.

SUMMARY OF THE INVENTION

Accordingly, the present invention provides a method and apparatus for producing a hollow, biaxially oriented, thermoplastic article having improved strength properties. The articles are biaxially oriented by stretching typically an average of up to about 4.0 times in the axial direction and about 2.5 to 7.0 times in the hoop direction. The preferred thermoplastic employed is polyethylene terepthalate having an inherent viscosity of at least 0.55. The article formed not only has improved strength properties, but also has reduced permeabilities to carbon dioxide, oxygen and water, making the process and apparatus particularly suitable for producing thermoplastic bottles useful for bottling beverages under pressure, such as carbonated sodas and beer. Polyethylene terephthalate bottles produced according to this invention have a density within the range of about 1.331 to 1.402 and the right cylinder section of the bottle has an axial tensile strength of about 5,000 to 30,000 p.s.i.; a hoop tensile strength of about 20,000 to 80,000 p.s.i.; an axial yield stress of at least 4,000 p.s.i.; and a hoop yield stress of at least 7,000 p.s.i. Typically, these bottles will have a shell thickness of about 10 to 30 mils, a ratio of weight in grams to volume in cubic centimeters of about 0.2 to 0.005:1, and a deformation constant equal to the slope of the log (reciprocal of the strain rate) versus strain having a value of at least about 0.65.

DETAILS OF THE INVENTION

Polyethylene terephthalate articles of this invention are generally cylindrical, typically in the shape of a soda bottle or a beer bottle, biaxially oriented, having densities ranging from about 1.331 to 1.402, and can be made to be transparent and glossy with no haze, or they can be dyed by the addition of a dye to the polymer. In addition, the articles have physical properties which make them very useful for containing liquids under pressure. These physical properties include high tensile strength, low creep at low weight to volume ratios, high resistance to impact (toughness), and good permeation qualities.

Polyethylene terephthalate useful in preparing the thermoplastic articles of this invention includes (a) polymers wherein at least about 97% of the polymer contains the repeating ethylene terephthalate units of the formula:

with the remainder being minor amounts of ester-forming components, and (b) copolymers of ethylene terephthalate wherein up to about 10 mole percent of the copolymer is prepared from the monomer units of diethylene glycol; propane-1,3-diol; butane-1,4-diol; polytetramethylene glycol; polyethylene glycol; polypropylene glycol; 1,4-hydroxymethylcyclohexane and the like, substituted for the glycol moiety in the preparation of the copolymer or isophthalic; bibenzoic; naphthalene 1,4- or 2,6-dicarboxylic; adipic; sebacic; decane-1,10-dicarboxylic acid, and the like, substituted for the acid moiety in the preparation of the copolymer.

The specific limits on the comonomer are governed by the glass transition temperature of the polymer. It has been found that when the glass transition temperature extends below about 50° C., a copolymer having reduced mechanical properties results. Accordingly, this corresponds to the addition of no more than about 10 mole percent of a comonomer. One exception to this, for example, is the addition of bibenzoic acid where the glass transition temperature of the copolymer remains above 50° C. and does not drop with the addition of more than 10 mole percent. Others would be obvious to those skilled in the art.

In addition, the polyethylene terephthalate polymer can include various additives that do not adversely affect the polymer in use such as stabilizers, e.g., antioxidants or ultraviolet light screening agents, extrusion aids, additives designed to make the polymer more degradable or combustible, such as oxidation catalyst, as well as dyes or pigments.

The polyethylene terephthalate should have an inherent viscosity (1% concentration of polymer in a 37.5/62.5 weight percent solution of tetrachloroethane/phenol, respectively, at 30° C.) of at least 0.55 to obtain the desired end properties in the articles formed and preferably the inherent viscosity is at least about 0.7 to obtain an article having excellent toughness properties, i.e., resistance to impact loading. The viscosity of the polymer solution is measured relative to that of the solvent alone and the Inherent viscosity $$= \frac{\text{natural logarithm} \frac{\text{viscosity of solution}}{\text{viscosity of solvent}}}{C}$$

where C is the concentration expressed in grams of polymer per 100 milliliters of solution.

Biaxial orientation of the articles of the present invention is useful to impart improved physical properties such as improved tensile strength and yield stresses. Biaxial orientation is accomplished by stretching the thermoplastic in the axial and hoop directions as the article is being formed. The article of the present invention is molecularly oriented by being biaxially stretched an average of about up to 4.0 times in the axial direction and about 2.5 to 7.0 times in the hoop direction. Preferably, such stretching is carried out at the orientation temperature of the thermoplastic, i.e. above the glass transition temperature and below the crystal melting point. The extent of the molecular orientation can be determined by known techniques. One method of determining molecular orientation is described in The Journal of Polymer Science, vol. XLVII, pages 289–306 (1960), entitled "X-Ray Determination of the Crystallite Orientation Distribution of Polyethylene Terephthalate Films," by C. J. Heffelfinger and R. L. Burton; and "Structure And Properties of Oriented Poly(ethylene Terephthalate) Films," by Heffelfinger and Schmidt in the Journal of Applied Polymer Science, vol. 9, page 2661 (1965). Both articles are hereby incorporated by reference.

Biaxial orientation is instrumental in providing excellent strength properties. Articles prepared according to the present invention typically do not have the same degree of orientation at every point on the article; however, the areas that are less oriented have a thicker shell than the areas that are more highly oriented, thereby providing relatively high overall strength to the article. In preparing a bottle, the thinnest shell thickness occurs in the right cylinder section; however, this section is the most highly oriented. In the right cylinder section of a bottle prepared by stretching, in accordance with this invention, the tensile strength and yield stresses typically are: axial tensile strength of about 5,000 to 30,000 p.s.i.; a hoop tensile strength of about 20,000 to 80,000 p.s.i.; an axial yield stress of at least 4,000 p.s.i. and a hoop yield stress of at least 7,000 p.s.i. The values of tensile strength and yield stress were determined by the method described in ASTM D–882, entitled "Tensile Testing."

The density (grams per cubic centimeter) of the article can range from about 1.331 to 1.402. Density was measured by the method described in ASTM 1505, entitled "Density Gradient Technique." Density is a measure of the crystallinity and this density range includes a crystallinity range of about 0 to 60%. The percent crystallinity is calculated from the following equation:

$$\text{Percent Crystallinity} = \frac{Ps - Pa}{Pc - Pa} \times 100$$

where $Ps$ = density of test sample (g./cm.$^3$)
$Pa$ = 1.333 (g./cm.$^3$), density of amorphous film of zero percent crystallinity
$Pc$ = 1.455 (g./cm.$^3$), density of the crystal calculated from unit cell parameters.

The formed articles themselves can have varying crystallinities along the axial length of each article, in which case, if desired, the article can be heat-set to achieve a uniform crystallinity in each article.

Orientation and crystallinity each contribute to certain properties; however, under some conditions, they are competitive. For example, increased orientation provides increased tensile properties but tends to decrease the thermal stability of the article. To offset the latter, the bottle can be heat set to increase the crystalliniy of the bottle.

Crystallinity is also related to the barrier properties of the article, particularly permeation properties. In bottling carbonated beverages under pressure, such as soda or beer, for example, it is important that the bottle have barrier properties sufficient to contain the cabonation and water in the beverage yet keep ou contaminants such as oxygen.

It has been found that increasing the crystallinity lowers the ability of carbon dioxide, oxygen or water vapor to permeate the bottle. The term "permeate" and its derivatives, used in this application, mean the ability of an agent such as carbon dioxide, oxygen or water vapor to pass through or diffuse through the shell of the articles of this invention. The degree of permeation encountered during the use of a bottle is dependent on many variables including the total surface area of the bottle, ambient temperature, the pressure inside the bottle, and the type and amount of liquid in the bottle.

When the crystallinity of the bottle is at least about 15% (density approximately 1.348), and the bottle is being used in a conventional manner for bottling sodas or beer in the usual consumer size bottle, i.e. 6-, 8-, 10-, 12-, or 16-ounce bottles, the degree of permeation related to the various permeating agents of concern is sufficient to meet commercial standards. For example, in bottles containing up to about 16 ounces of soda or beer under about 75 p.s.i.g. autogenous pressure at room temperature, i.e. about 25° C., wherein the shell thickness is between 10 and 30 mils, and a ratio of weight in grams to volume in cubic centimeters of about 0.2 to 0.005:1, the carbon dioxide leaving the bottle is no more than 15% in 30 days, the oxygen permeation through the shell into the liquid is no greater than 5 parts per million in 30 days and the amount of water lost from the liquid is no greater than 5% in 90 days.

The carbon dioxide permeation is measured by pressurizing a bottle with 75 p.s.i.g. of carbon dioxide, capping the bottle by conventional capping means, placing the pressurized bottle in a vacuum chamber where the vacuum is one micron of mercury, allowing the bottle in the vacuum chamber to equilibrate, then measuring the pressure rise in vacuum chamber as a function of time. Alternatively, the same pressurized bottle can be placed in a closed chamber with a stream of nitrogen made to pass by the bottle. Thereafter the stream of gas is scrubbed in a sodium hydroxide bath and titration of standard sodium hydroxide will indicate the amount of carbon dioxide picked up by the passing stream of nitrogen. The amount of carbon dioxide measured per unit of time provides the rate of carbon dioxide permeation.

The oxygen permeation is measured by filling a bottle with degassed water, sealing the bottle by conventional means, storing the bottle at room temperature and pressure and periodically measuring the oxygen content of the water inside the bottle by a known technique, i.e. silver electrode potentiometric titration.

The water permeation is measured by placing a dessicant inside of a dry bottle, sealing the bottle, storing the bottle at 37.8° C. in an atmosphere having a constant relative humidity of 100% then periodically weighing the bottle to determine the amount of water picked up by the dessicant. Alternatively, the bottle can be filled with water, pressurized to an autogenous pressure of 75 p.s.i.g. and capped, then placed in an atmosphere having a relative humidity of about 15% at 25° C. and periodically weighed for water loss.

Another significant property important to acceptability of the articles of this invention for use in bottling liquids under pressure, is that the bottle exhibits relatively low creep, particularly in thin walled, low weight articles. Creep is the change in structural dimension of the article on exposure to stress and is related to many factors including the stress level, the type of polymer, the physical state of the polymer, the ambient temperature and the time of exposure to stress. When considering creep in a generally cylindrical bottle, the size and shape of the bottle is also significant. In addition, the autogenous pressure in the bottle increases with increased temperature so creep resistance must be relatively constant over a reasonable use range of temperature and pressure. For typical uses such as bottling beer or soda, this temperature range is about 0 to 50° C. and the pressure range is about 0 to 100 p.s.i.g.

The stress levels encountered in a bottle used to contain a pressurized liquid, such as a carbonated beverage, are directly proportional to the autogenous pressure in the bottle, the diameter of the bottle and inversely proportional to the wall thickness.

The stress can be closely approximated by the expressions:

$$\sigma_{Hoop} = Pr/t$$

$$\sigma_{Axial} = Pr/2t$$

where $\sigma$ = stress
$P$ = autogenous pressure
$r$ = radius of right cylinder
$t$ = shell thickness.

Typically, a bottle having a diameter of about 2.00 inches with a right cylinder wall thickness of about 20 mils at room temperature and pressurized to about 75 p.s.i.g. will be exposed to and resist a hoop stress of about 3,750 p.s.i.

Thin shelled bottles are desirable, since this means the use of less polymer, making the bottle cheaper to manufacture. However, thin shells lead to increased stress levels and a need for greater creep resistance. Biaxially orienting a polymer, other factors remaining the same, increases the yield stresses of the bottle and is, therefore, a significant reason for orientation.

Creep is usually measured on polymers by placing a sample under a fixed load, i.e. stress, at a constant temperature and measuring the strain deformation as a function of time. The curves for thermoplastics have a characteristic shape in which the rate of strain decreases as a function of time. A plot of the log (reciprocal of the strain rate) versus strain results in a linear plot over a substantial part of the creep curve. The slope of the straight line segment herein referred to as the deformation constant, is mathematically expressed as:

$$DC = \frac{d \log (dt/d\epsilon)}{d\epsilon}$$

where

DC = deformation constant
$dt$ = differential of time
$d\epsilon$ = differential of the strain.

This deformation constant is applicable to related thermoplastics and can be used to compare the creep behaivor by comparing the slope values. A deformation constant equal to 0 indicates that the sample being tested is extending at its natural strain rate or for the load indicated, the srain rate is constant. A deformation constant of infinity indicates that there is no measurable strain indicated.

For bottles prepared according to the present invention, the deformation constant is at least about 0.65 indicating a deformation of less than 5% in 100 hours at 50° C. with an autogenous pressure of 75 p.s.i.g.

Still another property of the biaxially oriented polyethylene terephthalate articles of this invention is toughness or impact resistance. However, it is particularly related to the inherent viscosity of the polyethylene terephthalate. In general, increasing the inherent viscosity increased the impact resistance of the bottle. This is illustrated by a drop test wherein a bottle is filled and capped under typical bottling conditions with an autogenous pressure of 60 p.s.i.g. The bottle is then dropped on a concrete floor so that the point of impact is on the edge of the base. In testing bottles similarly prepared except for their inherent viscosity, it is found that in drops at 0° C. (a) bottles having an inherent viscosity of 0.85 on the average survive a six-foot drop but fail, i.e. crack or break open, on an eight-foot drop; (b) bottles having an inherent viscosity of 0.95 on the average survive two drops at eight feet but fail on the third; and (c) bottles having an inherent viscosity of 1.1 survive five drops at eight feet.

Figure 3:
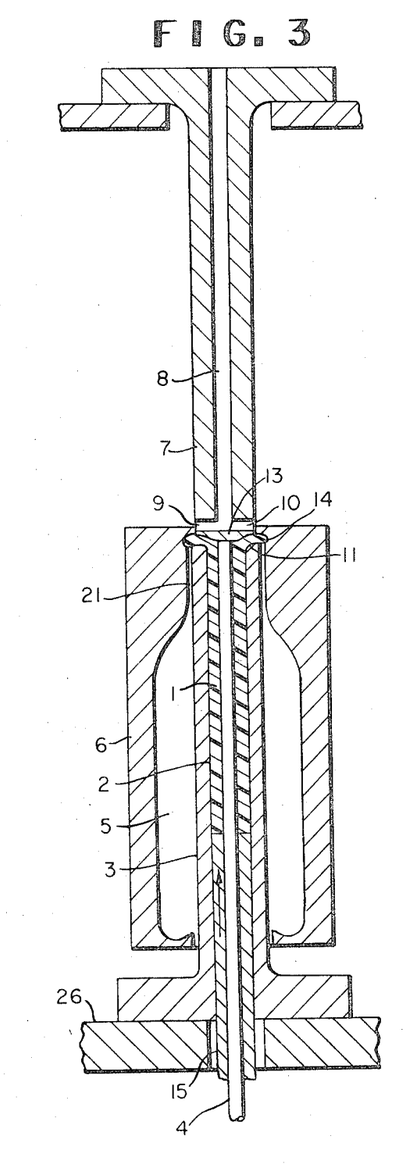
FIG. 3 is a fragmentary cross-sectional view of the apparatus of this invention positioned during the initial stage of forming a hollow article and specifically showing an anuular bead being formed.
Figure 4:
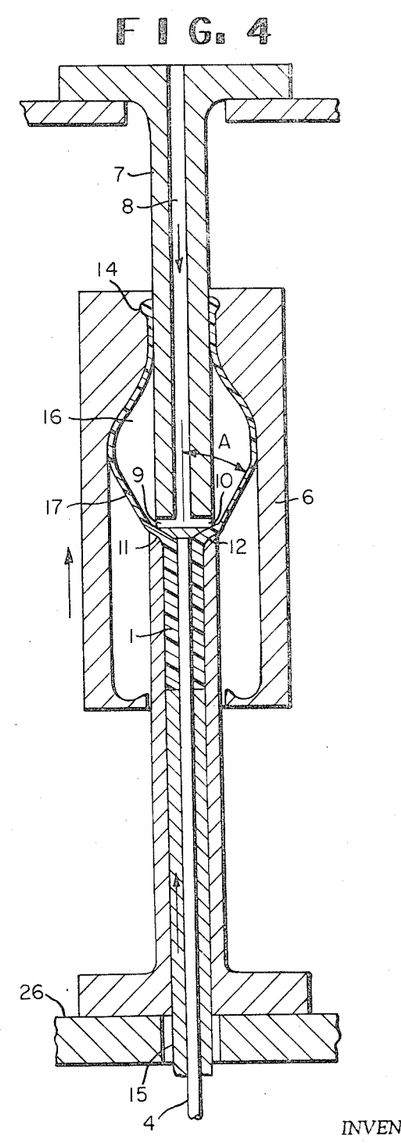
FIG. 4 is a fragmentary cross-sectional view of the apparatus of this invention positioned during the intermediate stage of forming a hollow article and specifically showing the crucial step of combined nonmolten extrusion and expansion by use of internal fluid forces.
Figure 5:
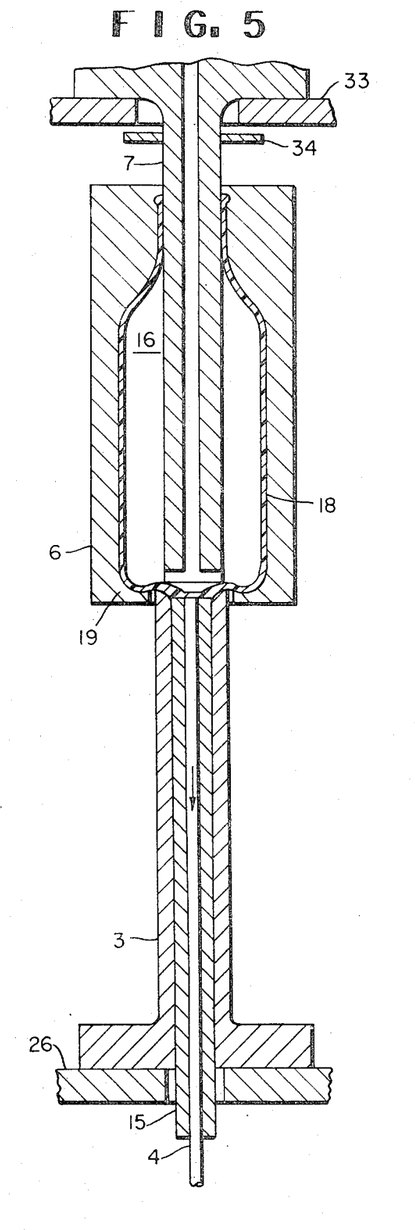
FIG. 5 is a fragmentary cross-sectional view of the apparatus of this invention positioned after the hollow article has been completely formed.

The apparatus useful in preparing the articles of this invention will be described in detail with the aid of the drawings. Referring to FIGS. 3 to 5, a hollow, cylindrically shaped, thermoplastic polymeric slug 1 described below is first placed in an extrusion chamber 2 formed by the bore of an extrusion barrel 3 and the outside cylindrical surface of a center supporting rod 4. A mold cavity 5 of mold 6 has an internal configuration such as the shape of the article desired and is positioned in a first location surrounding the extrusion barrel 3 as is particularly shown in FIGS. 1 and 3. The mold cavity 5 illustrated in FIG. 3 is one for use in fabricating a narrow neck bottle such as can be employed in bottling carbonated beverages.

The extrusion barrel 3 is in axial alignment with a mandrel 7 having a uniform outside diameter that is substantially the same as the inside diameter of the neck of the bottle being fabricated. A fluid passage 8 is contained within the mandrel 7 having fluid exit ports 9 and 10 at the end of the mandrel 7 that is in closest proximity to the extrusion barrel 3. Situated between the end of the barrel 3 and the end of the mandrel 7 is an annular extrusion orifice 11. This orifice can conveniently be formed by rounded end 12 of the extrusion barrel 3 and annular flared piece 13 which is attached to the body of the mandrel 7.

Figure 6:
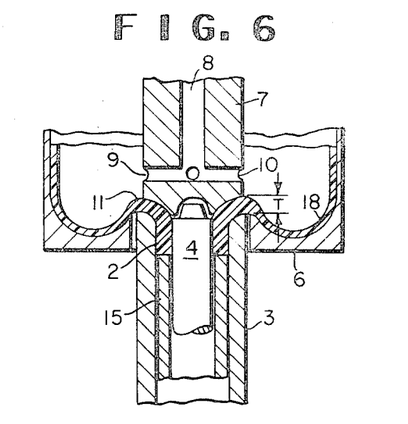
FIG. 6 is an enlarged fragmentary cross-sectional view of a portion of the positioned apparatus shown in FIG. 5 showing in greater detail the region around the annular extrusion orifice near the completion of the combined extrusion and expansion operation.
Figure 7:
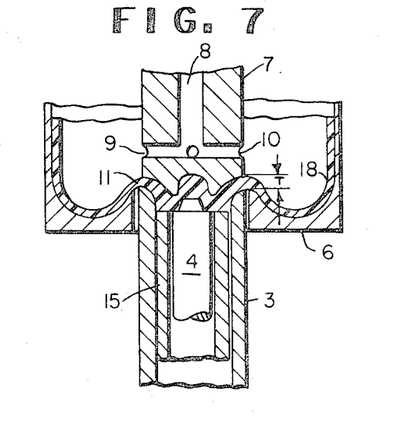
FIG. 7 is an enlarged fragmentary cross-sectional view similar to that of FIG. 6 but showing the region around the annular extrusion orifice upon the completion of the hollow article formation.

The annular extrusion orifice 11, shown in detail in FIGS. 6 and 7, is defined by the confronting end portions of the extrusion barrel 3 and the mandrel 7. In cross-sectional profile, both members are machined with a curving shape to provide a smooth transition from the annular extrusion chamber 2 outwardly and to provide a boundary for the annular extrusion orifice 11 such that the orifice is always convergent in its cross-sectional area. The orifice becomes progressively smaller in the direction of flow out to the outer boundary of its extrusion annulus which is proximate to the periphery of the mandrel 7 and from which the polymer emerges from the annular extrusion orifice 11 to enter the cavity 5 of the mold 6.

Referring to FIG. 6, the dimension of the orifice 11 measured axially is shown as T. In this figure, as in FIG. 7, the size of this dimension is enlarged for descriptive reasons. In an actual apparatus, the dimension T can range from about 0.01 to 0.075 inch depending on the characteristics of the polymer being formed and on the degree of orientation to be imparted. The orifice serves as the locus for high rate work input to the polymer that raises the temperature of the polymer to the orientation temperature range of the polymer, insuring good orientation characteristics. In general, the degree of orientation of the extrudate increases as the ratio increases between the average diameter of the extrudate as it emerges from orifice 11 and the average diameter of the slug.

The annular extrusion orifice 11 is area-convergent, as shown, in order to insure stable flow and a finite pressure drop between chamber 2 and the outer part of the orifice 11 during extrusion and especially at the time closing of the end of the bottle article is initiated; stated somewhat differently, a high pressure in the chamber 2 at the instant that the rod 4 is withdrawn, assures that polymer will flow inwardly from the chamber 2 (with the continued urging of the ram 15), effecting a closure.

The mold cavity 5 has an annular groove 14 within its contour that is initially located adjacent to the discharge side of the annular extrusion orifice 11. The mold 6 with its mold cavity 5 can also be moved from the first location shown in FIG. 3 to a second location shown in FIG. 5.

Figure 1:
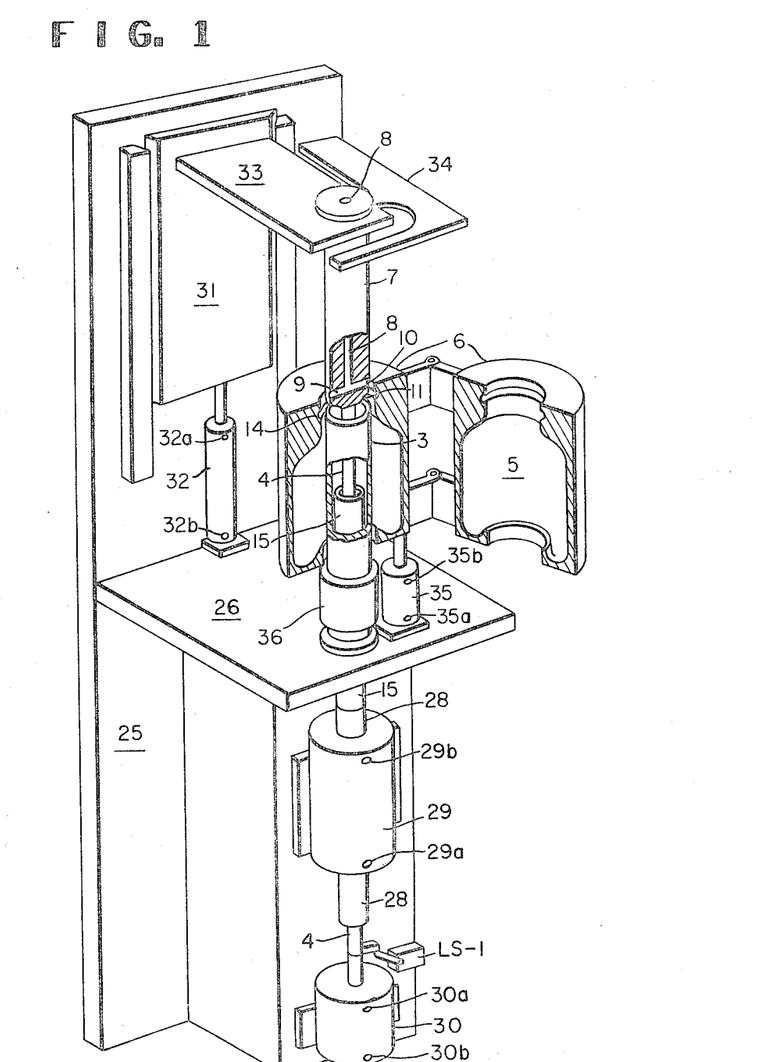
FIG. 1 is a perspective view of the apparatus of this invention, including means for actuating moving parts of the apparatus.
Figure 2:
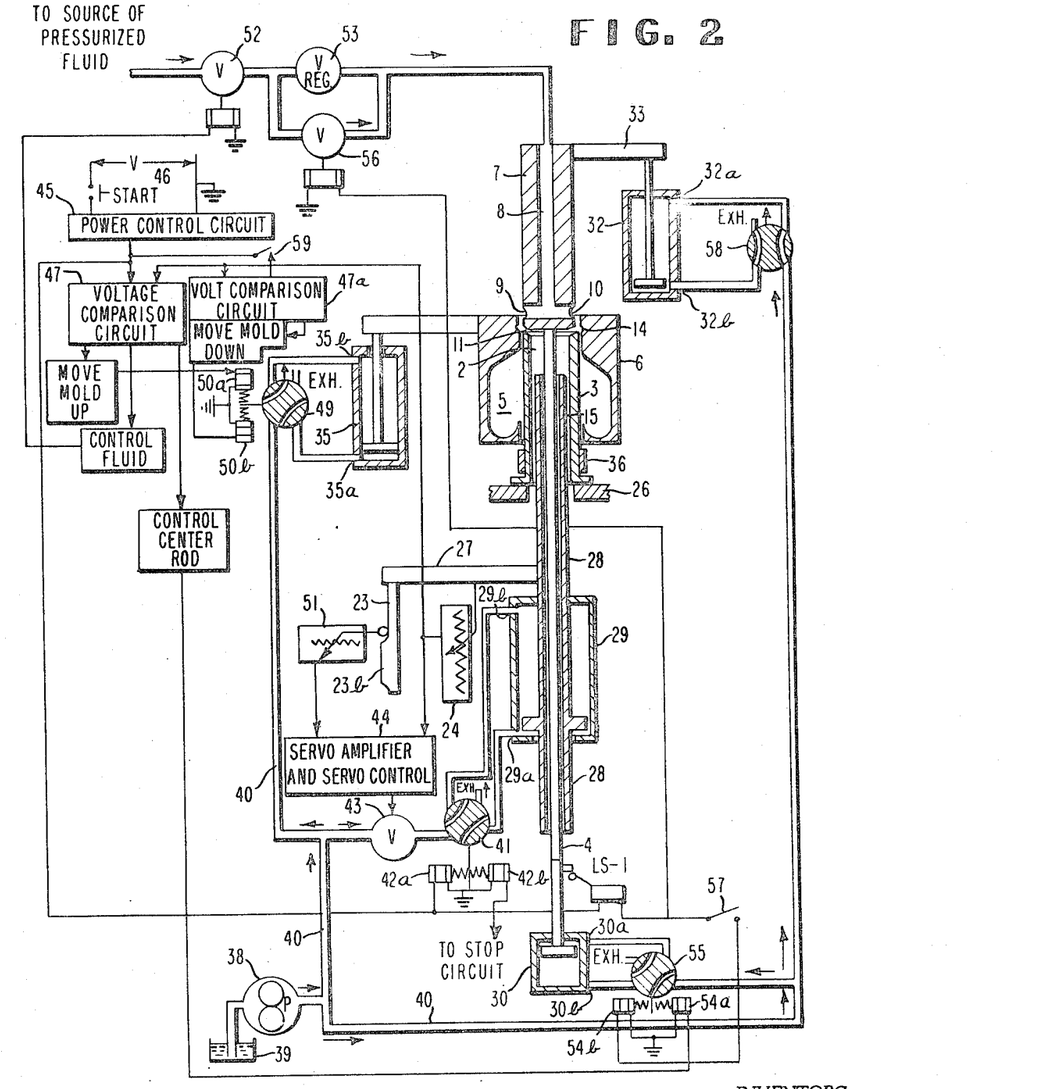
FIG. 2 is a schematic diagram of the principal parts of the apparatus of FIG. 1 showing hydraulic, fluidic and electrical circuits for actuating and controlling the apparatus.

Referring to FIGS. 1 and 2, the means for moving the various parts of the apparatus generally comprise hydraulic cylinders or hydraulic motors which are situated on a frame 25. The extrusion barrel 3 is flange mounted on a shelf 26 and is concentrically aligned with the hollow extrusion ram 15 which operates through an opening, not shown, in the shelf 26. Beneath the shelf 26 the ram 15 is aligned with and joined to the hollow tubular piston rod 28 of a non-differential, or double extended type, hydraulic motor 29 which is secured to the frame 25. Inside the bore of the extrusion ram 15 is the center supporting rod 4 which extends from the top of the extrusion barrel 3 entirely through the extrusion ram 15 and the tubular piston rod 28. Beneath the lower end of the piston rod 28 the center supporting rod 4 is joined to the piston rod of another hydraulic motor 30 which is likewise secured to the frame 25.

At the upper end of the frame 25 is a dovetail slide 31 arranged to be moved parallel to the axis of the barrel 3 by means of a hydraulic motor 32 the body of which is secured to the shelf 26. Joined to the slide 31 is beam 33 which supports the mandrel 7 in axial alignment and spaced relationship with the extrusion barrel 3. Extending outward from the frame 25 is a fixed bifuracted stripping fork 34, the tines of which straddle the mandrel 7 directly beneath the beam 33. The mandrel 7 can be raised vertically by means of the motor 32 to effect the stripping of a formed container, not shown, from the mandrel. Additionally, this action exposes the extrusion chamber 2 in the barrel 3 to permit the insertion of a new slug of plastic.

Surrounding both the mandrel 7 and the extrusion barrel 3 is a pieced mold 6 having apertures in its upper and lower extremities axially aligned with and slidable on both of these members. Mold 6 is movable vertically by use of hydraulic motor 35 the body of which is secured to the shelf 26. In FIGS. 1 and 2, the mold 6 is shown in its lowermost location, positioned for the initiation of a cycle. The mold 6 comprises two generally symmetrical halves with a planar parting face. The halves are hinged as shown in FIG. 1 but could be mounted on slides or links to permit the opening and closing on the extrusion barrel 3 and the mandrel 7. It should be understood that a movable clamping means, not shown, must be provided to secure the halves of the mold to each other to resist internal pressures of considerable magnitude. Such clamping means are well known in the art and generally comprise latches, pneumatic or hydraulic motors, screw clamps or the like. It will be understood that the mold walls may be made porous.

The mold parts may require heat or refrigeration depending on the material of the slug and may be provided with individual jackets or passages, not shown, for electrical or fluid heating or cooling. The extrusion barrel 3 may also require heat or refrigeration and jacket 36 is shown surrounding the part of the extrusion barrel that is accessible beneath the mold 6. If desired, the mandrel 7 can be equipped similarly.

Referring to FIG. 2, the hydraulic motors are controlled sequentially by means of several solenoid operated valves and an electrical control circuit. A gear pump 38 supplies fluid under pressure from a sump 39 to a plurality of conduits 40. The principal hydraulic motor is motor 29 which drives the ram 15 at a velocity determined by the profile of the cam 23. Cam 23 is carried on arm 27 by the rod 28 and is used to position a potentiometer 51 to produce a position-indicative output voltage. This output voltage is fed to servo control 44 which, in turn, controls the operation of the valve 43 by varying the rate of flow of fluid to the motor 29 via valve 41 in proportion to the output voltage, the voltage and the fluid flow being higher when the high part 23b of the cam 23 is reached. The valve 41 is a self-centering four-way solenoid valve having ports which are blocked as shown when the solenoids are not energized. When the solenoid 42a is energized, the valve 41 swings clockwise admitting fluid to port 29a of motor 29 while simultaneously opening port 29b to "exhaust," thus permitting fluid in the upper part of motor 29 to return to the sump 39 via a conduit, not shown. The admission of fluid to port 29a causes the ram 28 to be driven upward. When the opposite solenoid 42b is energized, the valve 41 will move counter-clockwise and drive the ram 28 down again.

The arm 27 on piston rod 28 also drives the movable part of a potentiometer 24 which produces an output voltage proportional to the position of the rod 28 and ram 15 and varies in magnitude. This varying signal is used for controlling several events to be described. The system is activated by means of a power control circuit 45 which supplies electrical energy from source 46 directly to solenoid 42a on valve 41 and simultaneously to voltage comparison circuit 47 which also receives the input voltage from the potentiometer 24. The circuit 47 is adapted to produce three different outputs sequentially depending on the magnitude of the voltage output of the potentiometer 24 which depends on the position of the rod 28 of the motor 29. Thus, as the rod and ram move, the following events occur in sequence:

(1) The mold 6 is set in motion upward at a constant velocity by means of motor 35 via valve 49 which is actuated by solenoid 50a.

(2) A short time later, pressurized fluid is admitted via solenoid valve 52 and needle valve 53 to mandrel 7, passage 8 and ports 9 and 10 at a controlled rate of flow.

(3) Near the end of the stroke of the ram 15, the mold stops at the end of the stroke of cylinder 35 and the center supporting rod is then triggered into action by a signal from circuit 47 to solenoid 54a. This causes valve 55 to admit pressurized fluid to the upper port 30a of motor 30 thus causing the center supporting rod 4 to be pulled downward. It should be understood that the stroke of the motor 30 is very short, such as 0.1 to 0.2 inch. Thus, this motor and the rod 4 quickly "bottom" in the downward direction and maintain this position.

As the rod 4 moves downward, a lug on the rod engages limit switch LS-1 which then causes valve 56 to be energized to the opened position. This action bypasses the needle valve 53 and admits fluid into mandrel 7 and ports 9 and 10 at a greater rate than before. As an optional mode of operation of motor 30, as the limit switch LS-1 is closed, the solenoid 54b may be energized via switch 57. This causes valve 55 to turn clockwise, exhausting fluid from the upper port 30a of the motor 30 and admitting pressurized fluid to the lower port 30b of the motor. Thus, in a very short period of time rod 4 is pulled down, limit switch LS-1 is actuated and the rod 4 is urged upward again.

At the start of a cycle or at any time after a cycle has been completed, the mold 6 may be opened and the mandrel 7 may be withdrawn upward by use of motor 32. Valve 58 may be turned manually from the "rest" position shown to a position in which pressurized fluid is admitted to port 32b thereby driving motor 32 and mandrel 7 upward to effect a stripping operation. At this stage, mold 6 and the ram 15 are in their uppermost positions. They are retracted by de-energizing the power control 45. This energizes solenoids 50b and 42b momentarily, causing valves 49 and 41 each to turn to admit pressurized fluid to the upper ends of motors 35 and 29, respectively, and causing them to drive "down." The solenoids are then de-energized which permits the valves 49 and 41 to return to their "centered" position with all ports closed. The extrusion chamber 2 in extrusion barrel 3 is again ready to receive a fresh slug after which the mandrel 7 may be lowered by use of motor 32 and valve 58.

Precision control of the movable parts of the apparatus of this invention is achieved electronically by the control means shown in FIG. 2. For example, immediately after the formation of the bead in annular groove 14, the mold 6 is set in motion at a constant velocity when the voltage comparison circuit 47 senses a preselected level of voltage output at the potentiometer 24 when the ram 15 has gone through a preselected stroke of about 0.5 to 1.2 inches. In the first increment of mold motion, the annular bead moves along and over the end of the mandrel 7 causing the extrudate to cover the ports 9 and 10. With continued mold motion, the voltage comparison circuit 47 senses a different preselected level of voltage from potentiometer 24, triggering valve 52 and admitting fluid at a preselected rate through valve 53. This expands part of the neck portion of the extrudate outwardly against the mold surface in annular space 21 as shown in FIG. 3.

As movement of extrusion ram 15 and mold 6 continues, the neck portion is completed and the diverging part of the mold cavity 5 begins to pass beyond the region where the ports 9 and 10 are located, thus permitting newly extruded plastic to be expanded to a greater degree than in the neck portion as generally shown in FIG. 4. At this stage, when the polymer has reached, or is beginning to reach, the largest part of the mold 6, the ram 15 and rod 28 have advanced to the point where the high part 23b of the cam 23 drives the potentiometer 51 to a different position causing valve 43 to open to a greater degree. This admits fluid at a greater rate to motor 29 which increases the rate of extrusion of polymer through orifice 11 and contributes more polymeric material to the outermost wall of the article being formed.

As the ram 15 nears the end of its stroke, the potentiometer 51 returns once again to a lower level position on cam 23 so that the rate of extrusion of polymer through orifice 11 is decreased; this occurs substantially as the wall of the article is being completed and the bottom is to be formed and results in a thinner bottom.

Similar precision control is achieved just before the mold comes to a stop. The center supporting rod is triggered into action when the voltage comparison circuit 47 senses a preselected level of voltage from potentiometer 24 at which point solenoid 54a is energized and valve 55 operates admitting fluid to port 30a of motor 30. This starts to pull rod 4 away from abutment with the end of mandrel 7 and causes actuation of limit switch LS-1. This action triggers solenoid valve 56 thus by-passing valve 53 and admitting pressurized fluid to cavity 16 at a greater rate than before. This effects the completion of the expansion of the extruded shape in a shorter time than if valve 53 continued to control the rate of ingress of fluid.

Additionally, if desired, switch 57 may have been closed so that actuation of switch LS-1 would have the added effect of reversing valve 55 so that a very short time after its withdrawal, the rod 4 would have been thrust toward mandrel 7. The space formerly occupied by the tip of the rod 4 is then occupied by polymer which, by this action, is subjected to an impact squeezing effect in coordination with the urging of the ram 15. This mode of operation is preferred since the simultaneous actions result in a sound, high density closure.

An alternate mode of operation is particularly suited for polymers which, after drawing or orienting, exhibit poor conformability to a mold especially in the final stages of forming a container, in the present situation, the blowing and forming of the bottom of the container. This mode of operation comprises essentially the mode described above with an added step of reforming the bottom of the container inwardly to form a concave recess. This is accomplished by the apparatus of FIG. 2 in which the voltage comparison circuit 47a is energized optionally by a switch 59; the circuit 47a also receives the voltage output of potentiometer 24 and is adapted to control "down" movement of the mold 6 via solenoid 50b of valve 49 in a manner to be described.

As described previously, travel of mold 6 in the upward direction during the forming of a container is controlled by voltage comparison circuit 47 which, when it senses that the output voltage of potentiometer 24 has reached a pre-set value, de-energizes solenoid 50a, restoring valve 49 to its "centered" position, thus stopping hydraulic motor 35. Ordinarily, the mold would continue to occupy the position at which it stopped; however, in the presently described mode of operation, at the instant that the solenoid 50a is de-energized, the voltage comparison circuit 47a (switch 59 closed), receiving the same voltage from potentiometer 24, acts to energize solenoid 50b; the latter actuates valve 49 to admit fluid to port 35b of hydraulic motor 35 thereby driving the mold 6 "down" again immediately. The voltage comparison circuit 47a after a short time delay de-energizes solenoid 50b, the mold 6 having moved through a short stroke (e.g., about 0.5 inch). When the solenoid 50b is de-energized the valve 49 becomes "centered" once again and the mold 6 comes to a stop.

Figures 8, 9, 10:
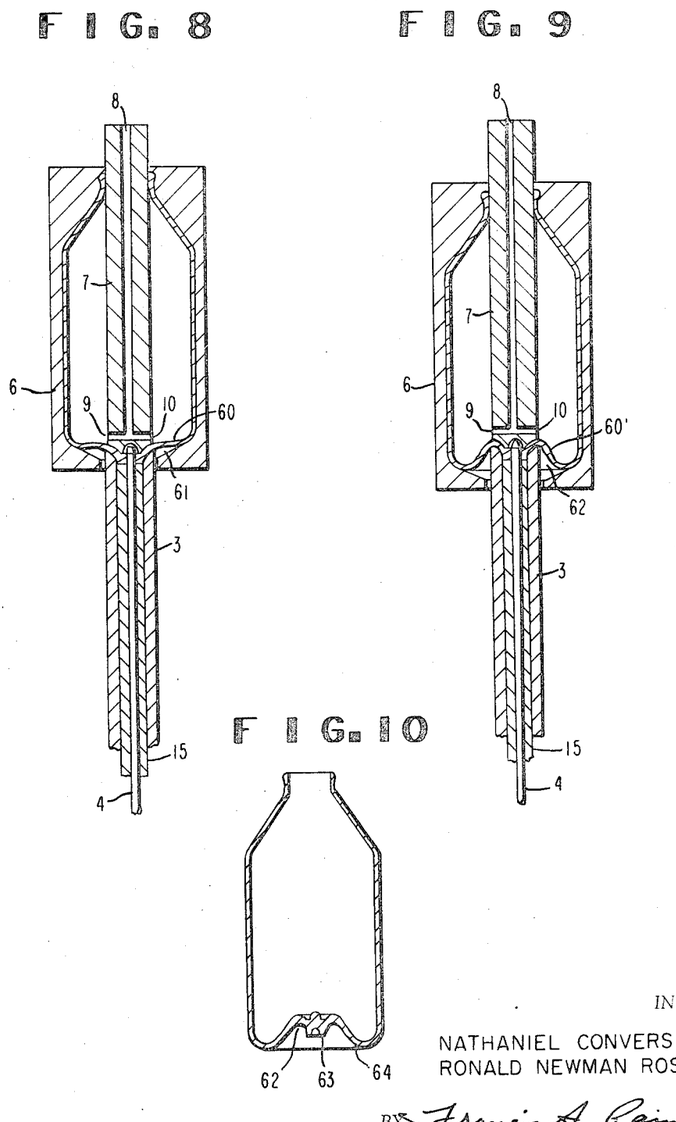
FIGS. 8 and 9 are fragmentary cross-sectional views of the apparatus of the invention adapted to handle polymers having poor conformability to the mold.
FIG. 10 is a bottle formed in the apparatus of FIG. 9.

The final steps in the forming of the plastic container, according to this mode of operation, are shown in FIGS. 8 and 9. In FIG. 8, the container is substantially complete with the mold 6 at the upward limit of its travel except that the plastic wall 60 has not conformed to the entire bottom portion of the mold, leaving a void 61 between plastic and mold. The next step, shown in FIG. 9, comprises moving the mold downward a short distance (e.g., 0.5 inch) to deform the plastic into a reverse bend and to form a truncated conical recess 62 in the bottom portion; during this step the generally conical wall 60' is stretched, imparting additional orientation to the conical wall 60'. It will be realized that the next and final step comprises close-off of the aperture occupied by the tip of the center supporting rod 4, a process step that has previously been described. The axial depth of the recess 62 or the downward stroke of the mold 6 is usually made great enough so that the plastic surface 63, FIG. 10, is either coplanar with the surface 64 or is slightly above it thus assuring stability when the container surface 64 rests on a support. The generally conical recess 62 serves the purpose of increasing the strength of the bottom of the container, improving its ability to resist internal pressures while minimizing the amount of plastic material needed for this purpose.

Referring to FIGS. 9 and 10, the bottom configuration of the bottle is described as a series of interconnected shapes beginning at the right cylinder section and terminating in the bottom center of the bottle comprised of (a) a curved section beginning at the right cylindrical section and curving in towards the longitudinal axis of the bottle forming a curve rotationally symmetrical about the longitudinal axis of the bottle and an annular seating area, that blends into (b) a truncated conical reentrant section leading into the interior, and directed towards the longitudinal axis of the bottle, that blends into (c) a toroidal knuckle forming an annular toroid directed away from the interior of the bottle, that terminates in (d) a central recessed disc-like section that is perpendicular to the longitudinal axis of the bottle.

In operation, the apparatus of this invention is used in the following manner: A thermoplastic polymeric slug 1 is placed within the extrusion chamber 2. Extrusion ram 15 is activated so as to force part of the non-molten thermoplastic polymeric material of the slug 1 through the annular extrusion orifice 11 and to the annular groove 14 in the end of the mold cavity 5. This first stage of extruding an annular bead from the thermoplastic slug 1 is shown in FIG. 3. It is seen that the first part of the slug 1 to leave the annular extrusion orifice 11 and enter the annular groove 14 forms a bridge or diaphragm around the entire upper part of the annular space 21 between the outside of the extrusion barrel 3 and the inside of the mold cavity 5 thereby effecting a seal. The extrusion of the slug into the groove 14 enables, in subsequent steps, the imposition of axial tension on the extrudate by moving the mold to stretch or draw the extrudate.

Immediately after the completion of the formation of the bead within the mold cavity 5 and in simultaneous sequence with the continued movement of the extrusion ram 15, the mold 6 is moved at a uniform rate of speed and a fluid, such as compressed air or liquid being packaged is forced through into the fluid passage 8, out of the fluid exit ports 9 and 10 and into cavity 16. This cavity is formed by the external surface of the mandrel 7, the extruded seal at the anular groove 14 and extruded shape 17 which was extruded by the annular extrusion orifice 11 and expanded by the compressed air from the fluid exit ports 9 and 10. This is shown in FIG. 4.

Thus, as mold 6 moves relative to the orifice 11, the bead formed in annular groove 14 anchors the newly formed bottle top to the mold 6 and effectively moves the fresh extrudate past the compressed air flowing from exit ports 9 and 10, thereby causing an almost immediate forcing of that extrudate against the wall of mold cavity 5 as it emerges from orifice 11.

The presently preferred method is centered on the production of a thermoplastic article having a nonuniform shell thickness due to the fact that the rate of extrusion and the speed of the mold are held constant while the mold itself has a varying shape. Shell thickness can be controlled by properly programming the apparatus to obtain either a uniform or a nonuniform thickness. Methods of programming shell thickness include varying the speed of the sliding mold or varying the extrusion rate of the slug.

The thermoplastic polymeric material of the slug 1 that is extruded through the annular extrusion orifice 11 becomes partially biaxially oriented from the extrusion operation. The remainder of the desired biaxial orientation of the extruded shape 17 is accomplished as the extrudate is drawn and expanded against the surface of the mold cavity 5 contained within the mold 6. There is a substantial decrease, e.g., up to 50% or more, in wall thickness of the extrudate after it has been drawn and expanded.

The slug 1 continues to be extruded through the annular extrusion orifice 11 by the extrusion ram 15 while the mold 6 moves toward the second location over the mandrel 7. The combined action of the extrusion of the slug 1 and the expansion of the extrudate 16 results in the desired shape of the bottle article 18 shown in FIG. 5, but having an unsealed bottom portion as best shown in FIG. 6. The bottom portion of the bottle article 18 is sealed by the withdrawal of the center supporting rod 4 while the mold 6 stops and the extrusion ram 15 continues to exert a force on the remaining polymeric material within the extrusion chamber 2. This is shown in FIG. 5 with the completely formed bottle article 19 which is in a highly biaxially oriented state.

FIGS. 6 and 7 show in greater detail the preferred bottom sealing operation in which the partial withdrawal of the center supporting rod 4 permits polymeric material of the slug, under the continued urging of the extrusion ram 15, to flow inward to effect a closure.

Alternatively, the bottom can be sealed according to the process disclosed in Carmichael, U.S. application Ser. No. 57,679, filed July 23, 1970, wherein a friction-welded bottom seal on a thermoplastic bottle is effected by contacting the bottom of the thermoplasic bottle in the area immediately adjacent the bottom opening with a rotating friction sealing head to raise the temperature of the thermoplastic material to about its melting point, working the hot thermoplastic material into and sealing the bottom opening, and thereafter quenching the sealed opening. The process can be carried out while the bottle is still in the mold or in a separate operation after the bottle is removed from the mold.

FIG. 7 shows the location of the parts of the apparatus upon the completion of the method for forming a hollow article from a hollow slug. In FIG. 7 the center supporting rod 4 has been withdrawn while the extrusion ram 15 depressed the remaining portion of the thermoplastic slug into the volume vacated by the repositioned center supporting rod 4.

In an alternate embodiment, the apparatus is modified by providing a moving center rod through the slug instead of a stationary center rod. This permits the use of a closed end or blind hollow thermoplastic slug wherein the closed end becomes the bottom of the article formed, eliminating the need for a separate bottom closure step. In addition, the center rod and slug move at the same rate during extrusion of the slug eliminating relative motion between the slug and the center rod, thereby minimizing the need for lubrication between the center rod and the slug while reducing the wear in the center rod.

Figure 11:
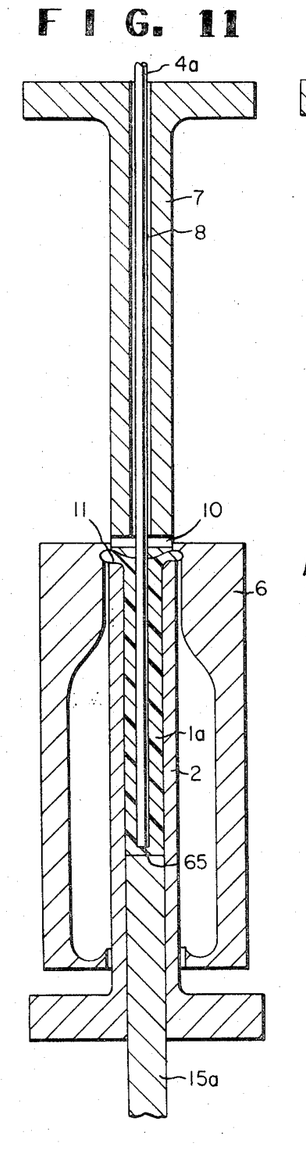
FIG. 11 is a fragmentary cross-sectional view of an alternate embodiment incorporating a sliding center rod with the center rod in its fully extended position.
Figure 12:
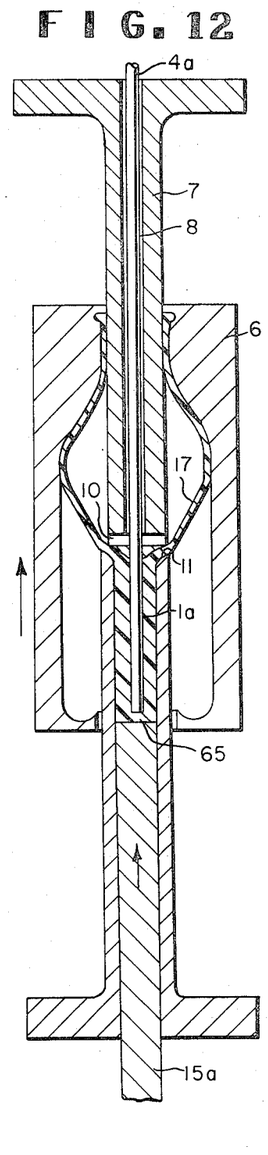
FIG. 12 is a fragmentary cross-sectional view of the alternate embodiment shown in FIG. 11 with the center rod at an intermediate stage of withdrawal corresponding relatively to the intermediate position of the sliding mold.
Figure 13:
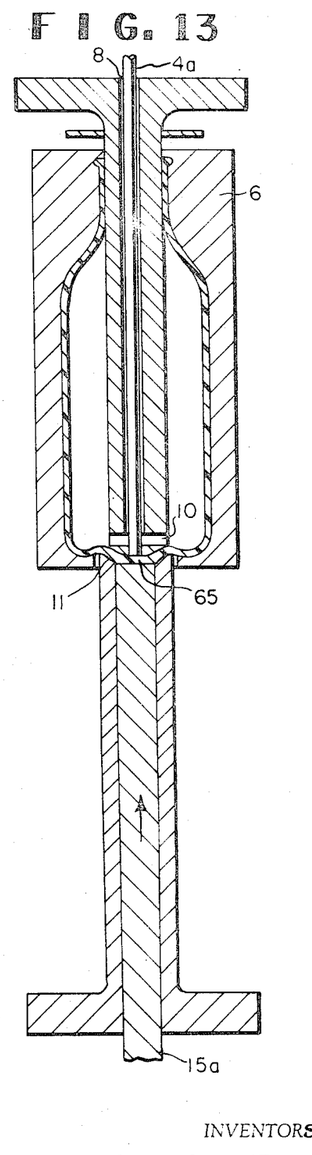
FIG. 13 is a fragmentary cross-sectional view of the alternate embodiment shown in FIG. 11 with the center rod completely withdrawn corresponding relatively to the final position of the sliding mold.

This alternate embodiment is shown in FIGS. 11 to 13 as it is used in the process of this invention. Referring to FIG. 11, a hollow cylindrical slug 1a having a closed end 65 is placed in extrusion chamber 2. Mold 6 is positioned in a first location wherein the mold cavity 5 surrounds extrusion chamber 2. Center rod 4a is positioned inside of slug 1a and extends into fluid passage chamber 8 within mandrel 7. If desired, the center rod can be heated by conventional means not shown, that in turn heats the thermoplastic slug. Extrusion ram 15a is modified to be a solid round bar positioned in extrusion chamber 2 abutting slug 1a containing the center rod 4a. The center rod is biased against the extrusion ram by conventional means not shown, exerting a nominal force against the extrusion ram sufficient to keep the extrusion ram from buckling the slug and to insure steady motion during extrusion. In a typical embodiment, the extrusion ram pressure is about 13,000 p.s.i.g. and the center rod biasing pressure is about 50 p.s.i.g.

In operation, extrusion ram 15a forces slug 1a out of extrusion chamber 2 through extrusion orifice 11 and around mandrel 7. FIG. 12 shows an article partially formed, where in the extrusion ram 15a has forced the slug into the sliding mold while simultaneously moving the center rod with the slug so that there is no relative motion between the slug and the center rod. Fluid is introduced through fluid passageway 8 around center rod 4a and out through port 10 into the interior portions of the extruded shell 17, forcing it against the mold cavity thereby shaping the article.

FIG. 13 shows an article completely formed inside of mold cavity 6. It can be noted that the bottom of the slug 65 is now the bottom center portion of the article. In addition, that portion of the center rod 4a that originated in the slug while the slug was in the extrusion chamber has been moved into fluid passageway 8.

After the thermoplastic article is formed, it can be heat treated by well known processes to increase the crystallinity level, thereby decreasing the ability of the gases to permeate the shell and improving dimensional stability which is important if the article is used to bottle hot beverages or is to be subjected to high temperatures and pressures in a pasteurization process.

Heat treatment is carried out at temperatures of about 140°–220° C. and exposure time is relatively short. However, it is generally desirable to conduct the heat treatment for a period of time sufficient to produce a degree of crystallinity in the finished product which is preferably at least about 30% up to 50% or more, the maximum attainable crystallization for polyethylene terephthalate being about 60%. In general, especially good results have been observed when this heat treatment step is carried out for a period of about 0.1 to 600 seconds. The upper limit of this treatment is not particularly critical, other than from an economical viewpoint, and a duration of treatment of up to 100 minutes is possible.

The thermoplastic slug useful in the present invention is hollow, but the term "hollow," unless otherwise indicated, is meant to include a tubelike slug having both ends open, or a tubelike slug having one end open and one end closed, i.e. a blind slug, wherein the slug is so positioned in the extrusion barrel that the closed end will form the bottom of the bottle. The tubelike slug having both ends open can be used with the apparatus incorporating a stationary center rod or a moving center rod but a blind slug can only be used with the apparatus incorporating a movable center rod.

The slug is preferably fabricated by conventional extrusion or injection molding methods from thermoplastic materials which are susceptible to increased strength or reinforcement when biaxially oriented. The slug itself can be biaxially oriented or unoriented prior to use. If an oriented slug is used, further orientation occurring in the extrusions drawing and expansion of the extruded slug is additive in effect. In addition, the slug should be practically amorphous with no more than about 5% crystallinity and clear in appearance. This will result in a clear formed bottle. If it is intended that the bottle be colored, however, the coloring agent such as a dye can be added to the slug forming polymer and, of course, result in a colored slug.

The dimensions of the slug to be used are determined by many factors including the desired thickness and the desired degree of orientation. Typically the slug is hollow and the radial dimensions are slightly smaller than the dimensions of the neck of the bottle to be formed as can be seen in the drawings. The axial length of the slug is slightly shorter than the dimension between the top and the center of the bottom as measured along the outside of the bottle to be formed. To improve the dimensional stability of the bottle, particularly the radial dimensions of the neck of the bottle, the slug first formed with substantially oversized radial dimensions, quenched to a temperature below the crystalline melt point of the polymer then forced through a reducing die slightly smaller than the radial dimensions of the neck of the bottle as shown in the drawings. For still further improved dimensional stability, the slug can be compressed in a chamber maintaining the same outside diameter with a tapering mandrel in the center of the compression chamber resulting in a very short slug having an outside diameter slightly smaller than the outside diameter of the neck of the bottle and an inside diameter of practically zero resulting in a very narrow hollow space about the size of a pin hole running through the center of the slug. The compressed slugs are used in the apparatus described above without the presence of the center rod or with the center rod fully retracted.

The process and apparatus of this invention can be used to prepare articles of various shapes and sizes from various thermoplastic materials. The preferred thermoplastic material is polyethylene terephthalate, and copolymer blends thereof as described above.

One reason polyethylene terephthalate is preferred is because when oriented, it exhibits excellent strength, creep resistance, and a low permeation factor, particularly with respect to carbon dioxide, oxygen and water vapor, making it excellently suited for use as a container for liquids bottled under pressure, such as sodas, beer, or aerosols. When forming with polyethylene terephthalate, it is advantageous to start with essentially amorphous material, i.e. crystallinity no greater than 5% in order to produce a clear bottle. Useful polyethylene terephthalate polymers have an inherent viscosity (1% concentration of polymer in a 37.5/62.5 weight percent solution of tetrachloroethane/phenol, respectively, at 30° C.) of at least 0.55. Preferably, the inherent viscosity is at least 0.7, because this produces a bottle having significantly improved toughness properties, e.g. increased impact resistance.

Impact resistance is measured by dropping a slug from various heights onto a concrete floor. In a drop test carried out on six-inch-long, amorphous polyethylene terephthalate having an inherent viscosity of about 1.1 wherein three slugs were used in testing having an average wall thickness in mils of about 138, 90, and 93, with a weight in grams of 27.8, 21.2, and 21.6, respectively, each slug sustained two drops from a height of one foot, two feet, five feet and eight feet without any apparent damage to the slug and, in addition, each slug sustained the impact of a five-pound weight dropped two times onto the slug from a height of one foot.

Other useful thermoplastic materials include copolymers of acrylonitrile/styrene/acrylate; acrylonitrile/methacrylate; methacrylonitrile copolymers; polycarbonates; polybis(para-aminocyclohexyl) dodecaneamide and other polyamides; polyformaldehyde; high density polyethylene and polyproplylene; other polyesters and polyvinyl chloride.

Laminar-walled bottles or the like can be produced by the process of this invention by employing a laminar-walled hollow cylindrical slug. Laminar-walled slugs are obtained by coaxially laminating two or more slugs of the same or different thermoplastic composition. Examples of practical combinations include polyethylene terephthalate on the inside coaxially laminated to polyvinylidene chloride copolymer or hydrolyzed ethylene vinyl acetate copolymer on the outside. Slugs of multi-polymer composition can be coextruded in two or more layers, i.e., preferably in three layers, with the additive polymer sandwiched between the base or bottle-making layers of polymer. Through the use of such a slug, it is possible to produce bottles of base resins with a selected laminate to be used as (1) a gas barrier, (2) coloring layer, or (3) degrading catalyst.

The extruded slug must be at a temperature within its range of biaxial orientation, i.e. the temperature range for the polymer being used wherein orientation can occur without line drawing. The heat generated during extrusion is generally sufficient for this purpose so that the slug can be extruded at room temperature. However, the orientation temperature range varies from polymer to polymer, depending on such factors as crystallinity, and the glass transition temperature of the polymer. If the orientation range of the polymer is so high that the heat of extrusion is not sufficient to raise the polymer temperature to its orientation range, then the slug can be preheated before extrusion.

The thermoplastic article formed is biaxially oriented and will have physical properties consistent with the type slug used.

The following examples illustrate the present invention. All parts, percentages and proportions are by weight unless otherwise indicated.

EXAMPLE 1

Polyethylene terephthalate polymer of inherent viscosity about 0.96 is made into a hollow cylindrically amorphous shaped slug 4.5 inches long, 0.680 inch outside diameter (O.D.) and 0.375 inch inside diameter (I.D.) weighing about 22.6 grams. The slug is preheated to about 92° C. and extruded through gap T of about 0.033 inch at a barrel temperature of about 85° C. in the apparatus described above. The velocity of the ram 15 is about 3.6 inches per second and the velocity of the mold 6 is about 5.1 inches per second. Air at about 255 p.s.i.g. pressure is introduced through ports 9 and 10. The internal mold diameter is about 2.5 inches.

A bottle is formed having a wall thickness of about 11.4 mils; the axial tensile strength is about 16,500 p.s.i. and the hoop tensile strength is about 26,700 p.s.i.

EXAMPLE 2

Example 1 is repeated except as follows:
Inherent viscosity _____________________ 1.0.
Slug length __________________________ 6.5 inches.
Slug O.D. ____________________________ 0.680 inch.
Slug I.D. ____________________________ 0.477 inch.
Slug weight _________________________ 23.5 grams.
Preheat temp. _______________________ 100° C.
Barrel temp. ________________________ 90–100° C.
Gap _________________________________ 0.035 inch.
Ram velocity ________________________ 5 in./sec.
Mold velocity _______________________ 5.8 in./sec.
Air pressure _________________________ 350 p.s.i.g.
Tensile (axial) _______________________ 8,000 p.s.i.
Tensile (hoop) _______________________ 30,300 p.s.i.
Wall thickness ______________________ 16.8 mils.

A thermoplastic bottle is produced according to the

EXAMPLE 3 procedure of Example 1, namely extruding and blow-molding a hollow cylindrically shaped slug 4.5 inches long with an outside diameter of 0.680 inch and an inside diameter of 0.375 inch weighing about 22.6 grams. The slug is made from polyethylene terephthalate which has a inherent viscosity of 0.91. The slug has a density on the outside surface of 1.332 and on the inside surface of 1.334, and a crystallinity of about 5%.

The bottle exhibits the following properties:

I

| Density and crystallinity of polymer from various points on the bottle | Density | Crystallinity, percent |
|---|---|---|
| Neck | 1.332 | 0 |
| Top of major cylindrical section | 1.345 | 6 |
| Middle of major cylindrical section | 1.356 | 17 |
| Bottom of major cylindrical section | 1.361 | 22 |
| Bottom of bottle | 1.332 | 0 |

II

| Tensile properties, right cylinder section | Axial | Hoop |
|---|---|---|
| Tensile strength (k.p.s.i.) | 7.8 | 23.8 |
| Elongation (percent) | 59 | 17 |
| Tensile modulus (k.p.s.i.) | 246 | 683 |
| Yield stress (k.p.s.i.) | 7.6 | 10 |

III.—BIAXIAL ORIENTATION RIGHT CYLINDER SECTION
[X-Ray orientation angles according to the articles incorporated by reference above]

| $2\phi$ peak | Direction of rotation, X(chi), $\phi$(phi) | Orientation angle | Peak max. |
|---|---|---|---|
| 17.0 | Plane perpendicular to beam | 83 (axial) | 0° X |
|  | Plane parallel to beam, scan 90 | 52 (hoop) | 0° X |
|  | 0 scan | 46 (hoop) | 0° X |
| 27.0 | Plane perpendicular to beam scan 0 |  |  |
|  | Plane parallel to beam, scan 90 | 32 (hopp) | 5° X |
|  | 0 scan | 40 (hoop) | 87° X |

Considering the X-ray orientation angles and the tensile properties above, the bottle exhibits and effective stretch ratio of about 3.5 times in the hoop direction and about 1.25 times in the axial direction.

(IV) PERMEABILITY RIGHT CYLINDER SECTION

Shell thickness _________________ 18 mils.
Water loss—Bottle filled with
  water stored at 17.5% relative
  humidity, 25° C. for 13 days __ 0.6 mg./hr.
Carbon dioxide loss—Bottle pressurized with carbon dioxide to
  a pressure of 40 p.s.i.g. at 25°  1.5 cc./day.
  C. Bottle had no permanent de-  (standard temperature and pressure).
  formation _____________________

(V) CREEP

Circumferential strips from the right cylinder section of a sacrified bottle at 50° C. resist a hoop tensile stress of 5,000 p.s.i. with creep at 100 hours at a value less than 2% and long term creep of 90 days, less than 5%. This corresponds to a deformation constant of about 1.5.

As many widely different embodiments of this invention may be made without departing from the spirit and scopet hereof, it is to be understood that this invention is not limited to the specific embodimens thereof except as defined in the appended claims, and all changes which come within the meaning and range of equavilence are intended to be embraced herein.

We claim:

1. A biaxially oriented bottle having a generally cylindrical section wherein the bottle has a density of about 1,331 to 1,402 and is prepared from polyethylene terephthalate having an inherent viscosity of at least about 0.55 with a ratio of the weight in grams of the polyethylene terephthalate to the inside volume of the bottle in cubic centimeters of about 0.2 to 0.005:1, and the generally cylindrical section of the bottle has an axial tensile strength of about 5,000 to 30,000 p.s.i., a hoop tensile strength of about 20,000 to 80,000 p.s.i., an axial yield stress of at least 4,000 p.s.i., a hoop yield stress of at least 7,000 p.s.i., and a deformation constant equal to the slope of the log (reciprocal of the strain rate) versus strain having a value of at least about 0.65 at 50° C.

2. The bottle of claim 1 in which the inherent viscosity of the polyethylene terephthalate used to prepare the bottle is at least about 0.7.

3. The bottle of claim 1 having a crystallinity in the generally cylindrical section of the bottle of at least about 15%.

4. The bottle of claim 1 prepared from polyethylene terephthalate mixed with a pigment.

5. The bottle of claim 1 having a shell thickness of about 10–30 mils in the generally cylindrical section of the bottle.

6. The bottle of claim 1 wherein the crystallinity of the polyethylene terephthalate is at least about 15% and the carbon dioxide permeation is no greater than 15% in 30 days when the bottle is at room temperature and contains about 75 p.s.i.g. autogenous pressure.

7. The bottle of claim 1 wherein the crystallinity of the polyethylene terephthalate is at least about 15% and the oxygen permeation infusion from the atmosphere into the bottle filled with a liquid and containing 75 p.s.i.g. autogenous pressure at room temperature is no greater than 5 parts per million in the liquid in 30 days.

8. The bottle of claim 1 wherein the crystallinity of the polyethylene terephthalate is at least about 15% and the water moisture permeation from the bottle containing water at room temperature and under an autogenous pressure of about 75 p.s.i.g. is no greater than 5% in 90 days.

9. The bottle of claim 2 wherein the generally cylindrical section of said bottle has a crystallinity of at least about 15% and a shell thickness of about 10 to 30 mils, and bottle permeation characteristics wherein the carbon dioxide permeation is no greater than 15% in 30 days when the bottle is at room temperature and contains about 75 p.s.i.g. autogenous pressure, the oxygen permeation infusion from the atmosphere into the bottle filled with a liquid and containing 75 p.s.i.g. autogenous pressure at room temperature is no greater than 5 parts per million in the liquid in 30 days, and the water permeation from the bottle containing water at room temperature and under 5% in 90 days.

10. The bottle of claim 9 prepared from polyethylene terephthalate mixed with a pigment.

11. The bottle of claim 1 in which the inherent viscosity of the polyethylene terephthalate used to prepare the bottle is at least about .90.

12. The bottle of claim 1 in which the inherent viscosity of the polyethylene terephthalate in the bottle is at least about 0.85.

13. The bottle of claim 1 in which the inherent viscosity of the polyethylene terephthalate in the bottle is at least about 0.95.

14. The bottle of claim 1 in which the inherent viscosity of the polyethylene terephthalate in the bottle is about 1.1.

References Cited

UNITED STATES PATENTS 3,294,885 12/1966 Cines et al.
3,314,105 4/1967 Amsden.
3,470,282 9/1969 Scalora.

MELVIN GOLDSTEIN, Primary Examiner

U.S. Cl. X.R.

18—5 BE; 215—1 C; 264—98, Dig. 33, 50, 64

REEXAMINATION CERTIFICATE (374th)
United States Patent [19]
Wyeth et al.

[11] B1 3,733,309
[45] Certificate Issued  Sep. 3, 1985

[54] BIAXIALLY ORIENTED POLY(ETHYLENE TEREPHTHALATE) BOTTLE

[75] Inventors: Nathaniel C. Wyeth, Mendenhall, Pa.; Ronald N. Roseveare, Wilmington, Del.

[73] Assignee: E. I. Du Pont de Nemours and Company, Wilmington, Del.

Reexamination Request:
No. 90/000,597, Jul. 23, 1984

Reexamination Certificate for:
Patent No.: 3,733,309
Issued: May 15, 1973
Appl. No.: 93,571
Filed: Nov. 30, 1970

Certificate of Correction issued Mar. 11, 1975.

Related U.S. Application Data

[63] Continuation-in-part of Ser. No. 885,853, Dec. 17, 1969, abandoned.

[51] Int. Cl.³ ............................................ B32B 5/16
[52] U.S. Cl. .................................... 428/35; 215/1 C; 264/513; 264/515; 264/534; 264/535; 264/539; 264/540; 264/DIG. 33; 264/DIG. 50; 264/DIG. 64; 425/530; 425/532; 426/127; 426/397; 528/308.1

[56] References Cited

U.S. PATENT DOCUMENTS

| | | |
|---|---|---|
| 3,033,235 | 6/1962 | Zimmerman . |
| 3,074,108 | 4/1960 | Wiley . |
| 3,202,739 | 1/1963 | Zavasnik . |
| 3,231,642 | 1/1966 | Goldman |
| 3,311,684 | 3/1967 | Heider . |
| 3,337,666 | 8/1967 | Wilkins . |
| 3,439,380 | 4/1969 | Seefluth . |
| 3,470,282 | 8/1967 | Scalora . |
| 3,496,143 | 2/1970 | Siggel . |

FOREIGN PATENT DOCUMENTS

| | | |
|---|---|---|
| 623357 | 10/1961 | Belgium . |
| 6504912 | 7/1965 | Netherlands . |
| 6810966 | 4/1969 | Netherlands . |
| 920415 | 3/1959 | United Kingdom . |
| 15838 | of 1964 | United Kingdom . |
| 35333 | of 1967 | United Kingdom . |
| 35335 | of 1967 | United Kingdom . |
| 35336 | of 1967 | United Kingdom . |
| 35337 | of 1967 | United Kingdom . |
| 1239751 | 7/1971 | United Kingdom . |

OTHER PUBLICATIONS

Plastic Handbook issued Jun. 20, 1969 by Asakura Shoten, pp. 514 to 518.
Pflueger Publication: Crystallized Polyethylene Terephthlate, a New Material for Technology, Kunstoffe (Plastic) vol. 57, No. 1, 1967.
Encyclopedia of Polymer Science and Technology, vol. 4–Collagen to Dialysis, 1966.
Encyclopedia of Polymer Science and Technology, vol. 6–Enzymes to Finishing, 1968.
Encyclopedia of Polymer Science and Technology, vol. 9–Molding to Petroleum Resins, 1968.

*Primary Examiner*—Lucille M. Phynes

[57] ABSTRACT

A hollow, biaxially oriented, thermoplastic article, particularly a bottle, prepared from polyethylene terephthalate wherein said article has an inherent viscosity of at least 0.55, a density of about 1.331 to 1.402 and a ratio of article weight in grams to volume in cubic centimeters of about 0.2 to 0.005:1. Such articles have excellent strength properties, are impact resistant, and are capable of holding liquids under pressures as high as about 100 p.s.i.g. at a temperature of about 50° C. without significant deformation making such articles useful in bottling liquids under pressure such as beer, carbonated beverages, or aerosols.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-14 is confirmed.

* * * * *